(12) United States Patent
Wei

(10) Patent No.: US 8,084,995 B2
(45) Date of Patent: Dec. 27, 2011

(54) INTELLIGENT LITHIUM-BATTERY-ACTIVATING CHARGING DEVICE

(76) Inventor: Pei-Lun Wei, Nantou (TW)

( * ) Notice: Subject to any disclaimer, the term of this patent is extended or adjusted under 35 U.S.C. 154(b) by 406 days.

(21) Appl. No.: 12/481,597

(22) Filed: Jun. 10, 2009

(65) Prior Publication Data

US 2010/0315042 A1  Dec. 16, 2010

(51) Int. Cl.
*H01M 10/46* (2006.01)

(52) U.S. Cl. ...................................................... 320/130

(58) Field of Classification Search .................. 320/107, 320/112, 114, 130, 132, 160
See application file for complete search history.

(56) References Cited

U.S. PATENT DOCUMENTS

| | | | |
|---|---|---|---|
| 5,955,869 A * | 9/1999 | Rathmann ..................... | 320/132 |
| 6,891,355 B2 * | 5/2005 | Kernahan ..................... | 320/132 |
| 2005/0077878 A1 * | 4/2005 | Carrier et al. ................. | 320/134 |
| 2007/0184339 A1 * | 8/2007 | Scheucher ..................... | 429/99 |

* cited by examiner

*Primary Examiner* — Edward Tso
(74) *Attorney, Agent, or Firm* — Leong C. Lei

(57) ABSTRACT

An intelligent lithium-battery-activating charging device is connectable between a charging power source and an application electrical device and contains an internal circuit that builds up a charging/discharging mode to correspond the charging power source to a lithium battery accommodated in the application electrical device. After a short time period of charging, which is short enough that the voltage detection circuit inside the application electrical device cannot properly respond, a time period of discharging follows and then discharging is stopped, so that the detection performed by the voltage detection circuit is delayed until the cycles of short time period charging and discharging are completed. If the detection shows the battery is not fully charged, then the charging operation starts again. During the charging process, ions are moved in one direction in one moment and then reversed in the next moment so that built up of deposition on electrodes can be avoided.

24 Claims, 7 Drawing Sheets

INTELLIGENT LITHIUM-BATTERY-ACTIVATING CHARGING DEVICE

(a) TECHNICAL FIELD OF THE INVENTION

The present invention generally relates to an intelligent lithium-battery-activating charging device, which, in the course of a charging process, controls a charging power source to carry out a process of controlled successive charging/discharging cycles on a lithium battery contained inside an electrical appliance so that ions around an electrode board of the battery are forced to move in a forward direction in one moment and in a backward direction in a next moment to induce a turbulent chemical reaction, avoiding build up of deposition of crystallization on the electrode board and increase of input/output impedance, whereby fault determination of battery being fully charged by the charging system can be eliminated and the lithium battery can be re-activated.

(b) DESCRIPTION OF THE PRIOR ART

A lithium battery, after being charged, may maintain a long standby period of time than regular chargeable cells. Thus, recently, various chargeable electrical appliances, such as a mobile phone, a notebook computer, a digital camera, and a rechargeable electrical drill, use a lithium battery to serve as a charging/discharging power source. However, the period of endurance that a lithium battery may last is getting shorter after each charging and this is referred to as aging of battery. A main cause of battery aging is the deposition built up on the surface of an electrode after repeated times of chemical reaction and the deposition reduces an effective surface area of the electrode that carries out the chemical reaction. The deposition on the surface of the electrode increases the impedances of input and output.

When a battery is being charged, a charging current Ic, which is a direct current, when passing through the input impedance Ri, induces a voltage drop $Vi=Ic*Ri$. The voltage detected by an internal protection circuit of the battery (the protection circuit being composed of an essential part of a voltage detection circuit, which is further added with an over-current cut-off protection function so that the circuit will also be referred to as a voltage detection circuit hereinafter) or a voltage detection circuit of a charger is $V=VB+Vi$, where VB denotes the actual voltage of the battery. The impedance induced by the deposition also possesses the characteristics of capacitor Cr, whereby the equivalent circuit becomes Ri in parallel connection with Cr. After the charging current Ic is cut off, due to the characteristics of capacitor, the voltage Vi will maintain for a period of time. This is the reason that an aged battery which is fully charged to 4.15V will becomes 4.0V when removed from the charger and later becomes 3.7V after a minor discharge of current.

Output impedance Ro also shows influence in discharging, and the influence is minor in case of small current discharging. However, the charged device (such as a mobile phone) accommodating a battery maintains a very long standby condition, meaning the small current working for a very long time, the output impedance Ro gets larger and imposes a substantial influence on the endurance of the product.

Thus, the major factor that battery aging affects the endurance of a product, such as a mobile phone, is the increase of input impedance Ri. During the charging process, the larger Ri is, the larger Vi becomes, and consequently, the effective voltage VB ($VB=V-Vi$) is more insufficient after being fully charged.

Currently, there are hundreds of millions of mobile phones are in use and all the lithium batteries used in the mobile phones face the problem of aging. Usually, after having being used for two years, the battery is undergoing a remarkable aging situation and a user may clearly find the insufficiency of the endurance. Due to the high expense, to replace a new battery is a little bit pity to the user, or sometimes, due to the fast marketing of new models of mobile phones, an old fashion mobile phone battery may be out of stock and out of production, making it difficult to find a new replacement battery. In such a situation, the mobile phone has to be disposed of Consequently, the total number of mobile phones disposed of is extremely huge for the whole world, and people gets a bad habit of easily discard a rechargeable electrical appliance, increasing the burden of pollution to the environment by the discarded products. This is a trouble to all of us. If it is feasible to really completely charge the aged batteries and also gradually activate the batteries in each time the batteries are charged, then the lifespan of a battery can be lasted longer and this is helpful to the user, the resources of the Earth, and environmental protection of the Earth.

A mobile phone is required to be small in size for easy portability in travel and this makes it offering only very limited functions, just like a buck transformer based charger (also referred to as alternate current (AC) to direct current (DC) circuit) that is plugged into a 110V wall socket of electric main or a direct current boost/buck charger (also referred to as DC to DC circuit) that is plugged into a cigarette lighter socket in an automobile or a universal serial bus (USB) power socket of a computer system, and an internal protection circuit built in the lithium battery provides protection against abnormality of voltage, current, and temperature. And, the mobile phone itself provides control and indication for a fully charged condition. Further, for charging a battery, the time period of charging is also an important factor. To shorten the time period of charging, a charger often uses a direct current to charge the battery after transformation and reduction of voltage. Charging with direct current offers a high efficiency for charging a new battery but it does not provide activation in each time of charging, whereby the endurance of the battery get very poor after being used for a while.

In view of the problem that charging a lithium battery causes a reduction of endurance of the lithium battery, the present invention aims to provide a solution to overcome such a problem.

SUMMARY OF THE INVENTION

The present invention aims to provide an intelligent lithium-battery-activating charging device. Since an internal protection circuit of a battery or a detection circuit of a charger is set to repeatedly detect the battery voltage during the process of battery charging, to avoid incorrect determination, the battery voltage detection circuit is provided with a function of delaying, which makes the detection be made after the voltage has exceeded the predetermined point for a given period of time. When a battery gets aged and the input impedance thereof increases, a voltage drop Vi caused by the impedance will be produced in the charging process. If it is possible to avoid the detection of this voltage Vi, then the detected voltage is the battery voltage VB, rather than VB+Vi, and consequently, the battery can really fully charged. The intelligent lithium-battery-activating charging device provided by the present invention has an internal circuit that has a charging/discharging mode, wherein after a period of time t1 of charging, a short period of time t2 of discharging is immediately carried out, and then the discharging stops and continuous charging with current Ic is performed for the time period t1. The time period t1 is proposed according to the factor that the voltage detection circuit of the original charging system cannot make a timely response in the time period t1 before it starts to carry out the discharging time period t2. With such a short time period t2, the voltage Vi is neglected, making the battery returning back to the actual voltage VB. The voltage level set up in the voltage detection circuit is thus forced back to the level of VB. The charged device will show an indication of being fully charged when the voltage VB reaches a level substantially equal to or greater than a predetermined value set in the voltage detection circuit of the charging system and this is the time when the battery is really fully charged. During the course of charging, a process of successive cycles of charging and discharging is performed whereby ions around an electrode board of the battery are forced to move in a forward direction in one moment and in a backward direction in the next moment to induce a turbulent chemical reaction, avoiding build up of deposition of crystallization on the electrode board to increase input and output impedances. An aged battery, when charged in this manner, besides being fully charged with electricity, can eliminate a fraction of the deposition of crystallization on the electrode board to reduce the impedance. After being charged in this manner for multiple times, an aged battery can be re-activated.

The intelligent lithium-battery-activating charging device of the present invention may serve as an intermediate circuit interfacing between an AC to DC charging power source and a charging power input terminal of a charged device. Here, the charged device can be an existing electrical appliance that can be charged from outside an enclosure thereof to an internally built lithium battery or a lithium battery that is independently deposited in an existing electrical appliance. The device of the present invention may exclude the charging power circuit to form a separate, stand-alone device, or alternatively, it may combine an AC to DC charging power circuit to form a complete-function charger. When the novel circuit is arranged as an independent device, the AC to DC charging power that it needs can be directly retrieved from a charger provided for the charged device (such as a charger for a mobile phone or a power device of a notebook computer), making the device as an accessory for being used at any suitable time, for example when there is no hurry in performing the charging operation, when it is desired to re-activate a battery and to extend lifespan thereof, or when it is desired to prolong the endurance of an aged battery, where the device of the present invention can be readily installed on or removed from an original charger that is provided for the charged device and uses the power of the original charger and the charging function of the charged device to reduce the volume and cost of the device. Thus, the battery can be re-activated by using only the accessory device together with an existing charger currently in hand and an aged battery can be fully charged. This provides a significant effect for the hundreds of millions of currently used mobile phones. Certainly, as mentioned previously, the AC to DC charging power circuit and the novel circuit of the present invention can be combined together to form a novel charging device (which is a complete-function charger having the novel functions offered by the present invention). For example, for commercial market of mobile phone charging services, a universal charger that contains the circuit of the present invention can be made for receiving the plug in of all modes of mobile phone battery to carry out charging to the mobile phone battery. Thus, both cases that the circuit of the present invention is formed as an independent device externally connectable between the AC to DC charging power and the charged device and that the circuit of the present invention is combined with the AC to DC power source to form a complete-function charger are feasible.

Further, to cope with over-voltage of the battery, the intelligent lithium-battery-activating charging device of the present invention is further added with a function of voltage detection, wherein the charging mode is added with a process of voltage detection after a discharging step, meaning after a period of time t1 of charging, a short period of time t2 of discharging is immediately carried out, and then the discharging stops and voltage is detected. When the voltage exceeds a predetermined level, the charging mode is automatically converted to continuous charging. At this time, the voltage detected by the existing charging system becomes VR+Vi, indicating the voltage is fully charged and charging is then stopped and indication is made, whereby over-voltage protection of the battery is realized.

Further, in case that the present invention offers the function of battery voltage detection and serves as an intermediate circuit, to allow for versatile input powers by receiving an external DC power, such as a power source of an automobile cigarette lighter and a USB power socket of a computer, a DC to DC circuit is selectively provided at the power input terminal to increase or reduce an input voltage level as being controlled by a control circuit. Even that the input power is obtained from an original charger of an existing charged device, to shorten the time period needed for charging a terribly aged battery, a voltage-raising DC to DC circuit can be added to heighten the charging current and avoid over-long charging period.

Besides what discussed above, the intelligent lithium-battery-activating charging device of the present invention can be selectively added with functions of indication of being fully charged and detection of temperature, which are realized with a circuit comprising a light emitting diode, whereby the situations of being in charge, being fully charged, and temperature abnormality can be display with the light-emitting diode, which can take the place of the existing charging system or charged device that does not have indication function for showing reminder to a user.

Finally, in the intelligent lithium-battery-activating charging device of the present invention, the ratio between the discharging time period t2 and the charging time period t1 affects the charging performance. Since all the batteries have different degrees of aging, the optimum time periods t1, t2 for lying the detection system are different. For example, for a new battery, t1 is long, while t2 is short, and t1 gets shorter and t2 gets longer for more aged battery. Further, the optimum time periods t1, t2 corresponding voltage increase in the course of charging are different. To obtain a high performance charging mode, it is desired to establish an intelligent charging mode that automatically adjusts the time periods t1, t2 according to the aging degree of a battery. In the so called "intelligent charging mode", when charging is initiated, t1/t2 have initial values (for example 2.0 ms/0.5 ms) for carrying out charging operation. After charging has been performed for a short period of time (such as 5.0 sec), if the battery is not yet fully charged, the charging circuit is shut down and the control circuit changes the ratio of t1/t2 (such as 3.0 ms/0.5 ms) and again, the charging operation is performed for a short period of time. If in this short period of time, the battery is still not yet fully charged, then the ratio of t1/t2 is changed step by step by increasing a fixed increment each time (for example, t2 maintaining unchanged, but t1 increasing 1.0 ms each time) until the maximum value (such as 10.0 ms/0.5 ms) of t1/t2 is reached, which is then maintained for proceeding with the charging operation. When it is detected that the battery itself shuts down the charging circuit during the charging operation carried out under a charging mode of any t1/t2 ratio, the charging switch is immediately shut down and change of the charging mode to an upper level (namely the current charging time t1 minus 1.0 ms) is made for subsequent charging operation. This process of decrementing is repeated until it reaches the initial value of t1/t2 (such as 2.0 ms/0.5 ms). Afterwards, if it occurs again that the battery itself shuts down the charging circuit, then it may enter a battery fully-charged condition, or it may enter a process of reducing the charging current until it reaches a predetermined value where it enters a battery fully-charged condition. This kind of intelligent charging mode can be built in a microprocessor of the control circuit in the form of software or program so that no hardware modification is needed. This is the reason that the present invention is named an "intelligent" device.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
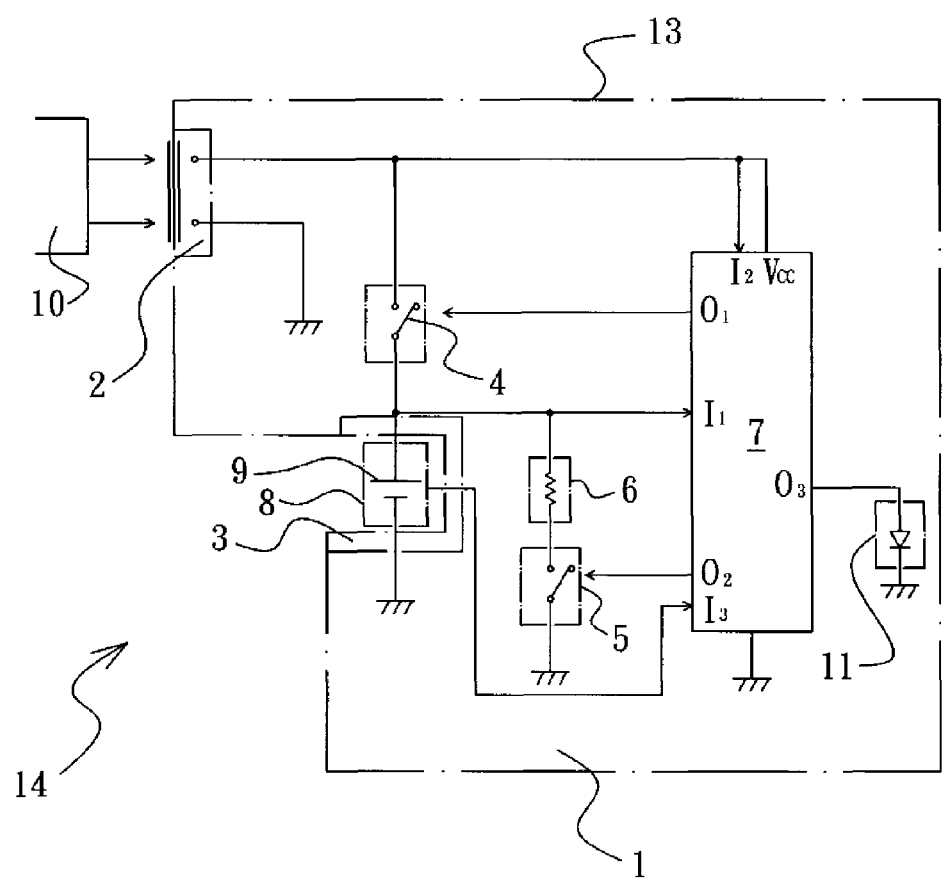
FIG. 1 is a block diagram illustrating a basic structure of an intelligent lithium-battery-activating charging device in accordance with the present invention.

FIG. 1 is a block diagram illustrating a basic structure of an intelligent lithium-battery-activating charging device in accordance with the present invention. From the drawing, it is shown that the intelligent lithium-battery-activating charging device 14 of the present invention comprises an enclosure 13 accommodating therein at least a charging power input terminal 2, a controllable charging power output terminal 3, a charge gate control circuit 4, a discharge gate control circuit 5, a discharged electricity consuming circuit 6, and a control circuit 7 to form an operation circuit 1. As shown, the control circuit 7 comprises a microprocessor. The whole structure of the device uses the charging power input terminal 2 to connect an output terminal of an existing charging power circuit 10, wherein the circuit 10 can be for example an internal circuit of a plug-type alternate current (AC) to direct current (DC) transformer belonging to an existing electrical appliance, or an AC to DC power circuit that is not individually provided with a circuit board enclosing housing, or a DC to DC circuit of an existing electrical appliance from which electrical power can be received; uses the controllable charging power output terminal 3 to connect a charging terminal 8 of an existing charged device 9, wherein the existing charged device 9 can be an existing electrical appliance (such as a mobile phone and a notebook computer) that can be charged from outside an enclosure thereof to an internally built lithium battery or a lithium battery that is independently deposited in an existing electrical appliance; connects an input terminal of the charge gate control circuit 4 to the charging power input terminal 2 to receive the DC charging power supplied by the charging power circuit 10, wherein the output terminal of the charge gate control circuit 4 is split into three branches, of which one is connected in series through the controllable charging power output terminal 3 to the existing charged device 9, another one is connected to a first input terminal I1 of the control circuit 7, and the remaining one is connected in series through the discharged electricity consuming circuit 6 to the discharge gate control circuit 5 for grounding; and a first output terminal O1 of the control circuit 7 is connected to a gate control terminal of the charge gate control circuit 4, a second output terminal O2 of the control circuit 7 is connected to a gate control terminal of the discharge gate control circuit 5, and a power input terminal Vcc of the control circuit 7 is connected to the charging power input terminal 2 to receive the DC charging power supplied from the charging power circuit 10. By means of the control circuit 7 respectively issuing commands to the charge gate control circuit 4 and the discharge gate control circuit 5 during a charging process, the circuits 4, 5 are alternately and repeatedly opened and closed in a timed manner, just like a switch, to undergo a process of successive cycles of charging and discharging, whereby during the process of charging, the existing charged device 9 is subjected to repeated electrochemical stimulation so as to remove the crystallized deposition formed on an electrode board of the lithium battery and thus reduce impedance. With multiple times of this way, a new lithium battery can be protected against aging and deposition and a used lithium battery can be gradually activated.

Further, since an integrated circuit is expandable in setting control functions thereof, it can be properly set or selected in such a way that, as shown in the drawings, a second input terminal I2 of the control circuit 7 is set to detect voltage and is connected to the charging power input terminal 2 for receiving the DC charging power supplied from the existing charging power circuit 10, or additionally, a third input terminal I3 of the controllable charging power output terminal 3 is used to control the controllable charging power output terminal 3 and responds for detecting a working temperature of the charged device 9, and further a third output terminal O3 of the control circuit 7 is connected to an indication circuit 11 and then grounded. The indication circuit 11, as shown, is composed of a light-emitting diode (LED). As mentioned above, the charge gate control circuit 4 and the discharge gate control circuit 5 are alternately opened and closed as a timing switch and each time when the discharge gate control circuit 5 completes discharge of electricity, a short period of time of stop is applied to allow the control circuit 7 to detect the voltage and temperature of the existing charged device 9. In this way of proceeding with the process of successive cycles of charging and discharging, when the control circuit 7 detects a fully charged condition or a temperature abnormal condition, the provided indication circuit 11 is activated to indicate the condition for taking the place of a charging system of an existing electrical appliance or an existing charging device that is not equipped with indication functions to give off a remind to a user for immediately stopping the existing charging power circuit 10 charging the existing charged device 9. And, the control circuit 7 detects the input power so that when the existing charging system shuts down the charging current, the voltage of the input power rises, and the control circuit 7, once detecting the input power exceeding a predetermined level, immediately conducts off the discharge gate control circuit 5 to stop further discharge.

Figure 2:
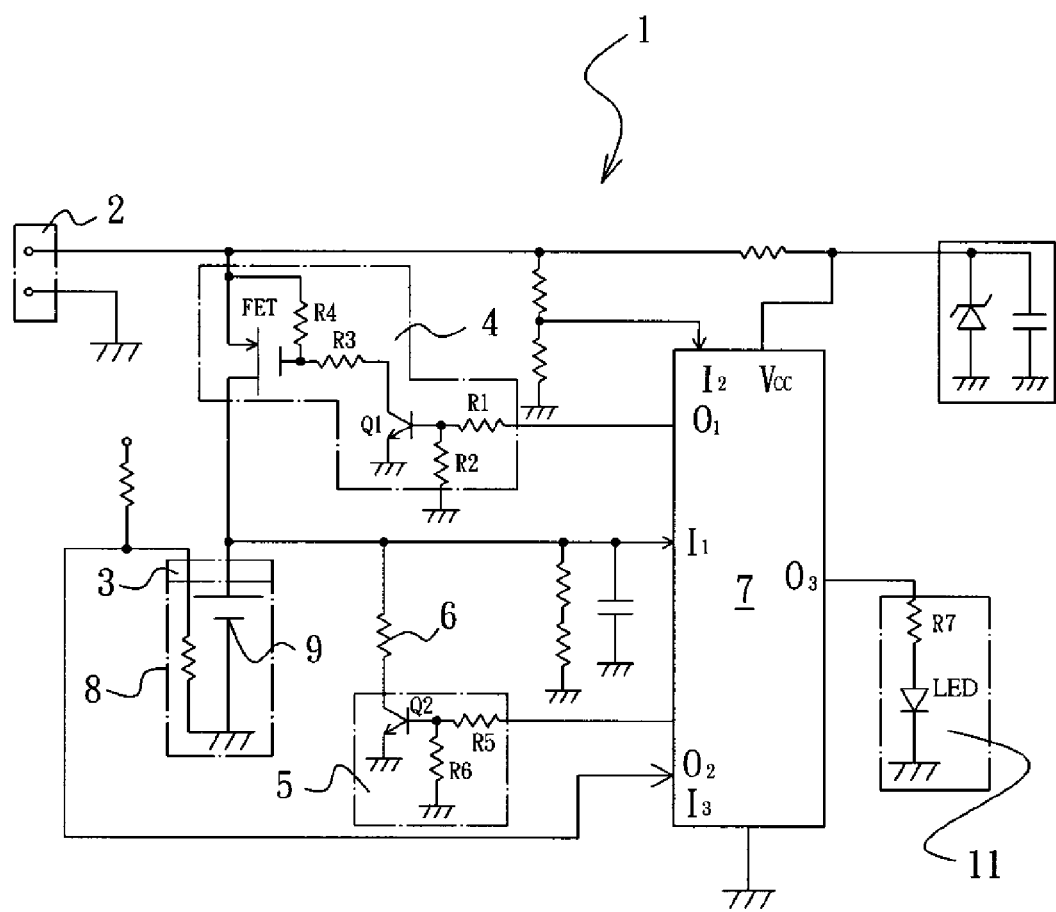
FIG. 2 shows an embodiment of circuit of the intelligent lithium-battery-activating charging device of the present invention.

As to the embodiment of the circuit, as shown in the embodiment of circuit of FIG. 2, the discharged electricity consuming circuit 6 is embodied as an electrical resistor, and the charge gate control circuit 4 is composed of a field effect transistor FET, a first transistor Q1, a first resistor R1, a second resistor R2, a third resistor R3, and a fourth resistor R4. A source of the field effect transistor FET is connected to the charging power input terminal 2 and a drain of the field effect transistor FET is connected to the controllable charging power output terminal 3 and is also connected to the discharged electricity consuming circuit 6 and the first input terminal I1 of the control circuit 7. A gate of the field effect transistor FET is connected through the third resistor R3 to a collector of the first transistor Q1 (with the gate of the field effect transistor FET being the gate control terminal of the charge gate control circuit 4). A base of the first transistor Q1 is connected through the first resistor R1 to the first output terminal O1 of the control circuit 7. A node between the base of the first transistor Q1 and the first resistor R1 is grounded through the second resistor R2. An emitter of the first transistor Q1 is grounded. The fourth resistor R4 is connected between the gate and the source of the field effect transistor FET.

Figure 2A:
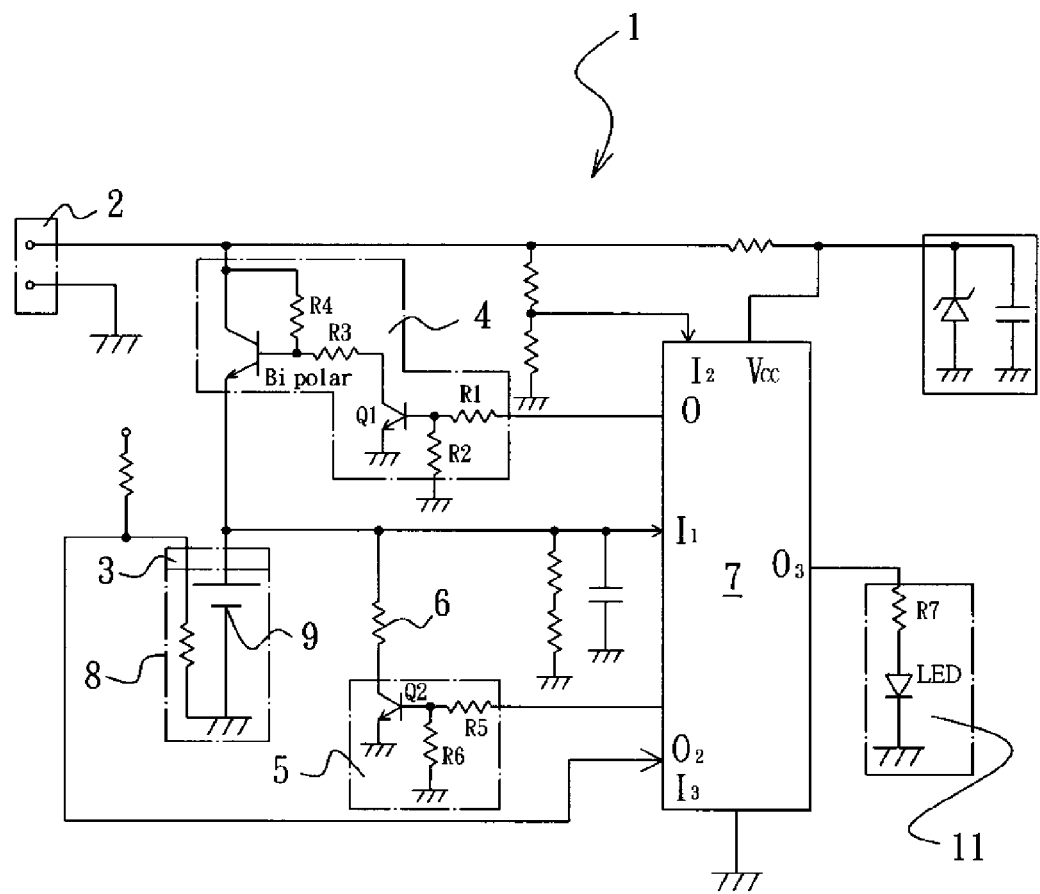
FIG. 2A shows another embodiment of circuit of the intelligent lithium-battery-activating charging device of the present invention.

As shown in another embodiment illustrated in FIG. 2A, the field effect transistor FET can be replaced by a bipolar transistor with the same power effect. A collector of the bipolar transistor is connected to the charging power input terminal 2 and an emitter is connected to the controllable charging power output terminal 3 and is further connected to the discharged electricity consuming circuit 6 and the first input terminal I1 of the control circuit 7. A base of the bipolar transistor is connected through the third resistor R3 to the collector of the first transistor Q1 (with the gate of the bipolar transistor being the gate control terminal of the charge gate control circuit 4). And, a fourth resistor R4 is connected between the base and the collector of the bipolar transistor.

The discharge gate control circuit 5 is composed of a fifth resistor R5, a sixth resistor R6, and a second transistor Q2. A collector of the second transistor Q2 is connected to the discharged electricity consuming circuit 6. A base of the second transistor Q2 is connected in series through the fifth resistor R5 to the second output terminal O2 of the control circuit 7 (wherein the base of the second transistor Q2 serves as the gate control terminal of the discharge gate control circuit 5). A node between the base of the second transistor Q2 and the fifth resistor R5 is grounded through the sixth resistor R6. An emitter of the second transistor Q2 is grounded. The indication circuit 11 is composed of a seventh resistor R7 connected in series with a light-emitting diode LED. An end of the seventh resistor R7 opposite to the end thereof connected to the light-emitting diode LED is connected to the third output terminal O3 of the control circuit 7. An end of the light-emitting diode LED that is opposite to the end thereof connected to the seventh resistor R7 is grounded.

Figure 3:
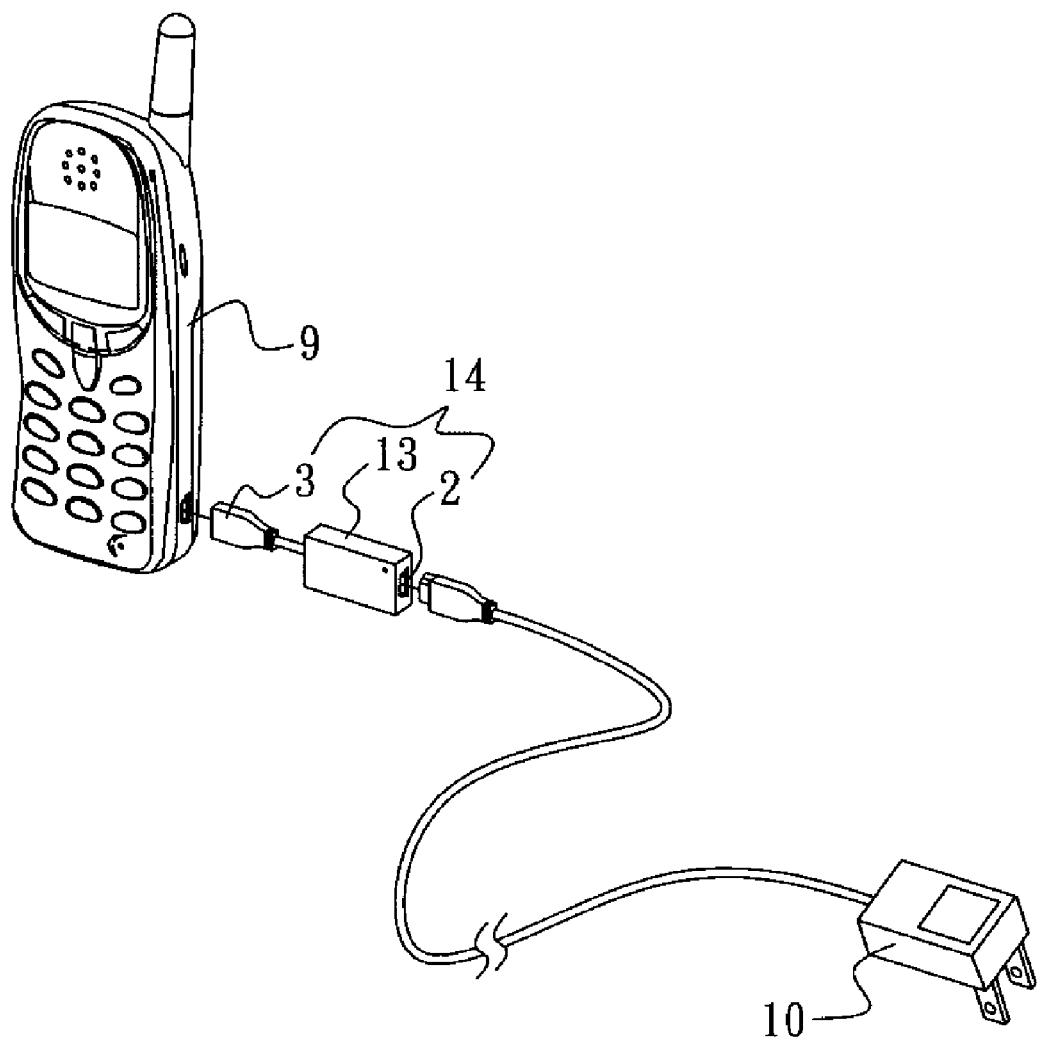
FIG. 3 is a schematic view demonstrating an example of practical operation of the intelligent lithium-battery-activating charging device of the present invention.

As shown in a schematic view demonstrating an example of practical operation illustrated in FIG. 3, the charging power input terminal 2 of the intelligent lithium-battery-activating charging device 14 of the present invention can be connected, with mated female/male connection, to an output terminal of a charging power circuit 10 and the controllable charging power output terminal 3 of the intelligent lithium-battery-activating charging device 14 of the present invention is connected, with mated female/male connection, to a charging power input terminal of the existing charged device 9, so that the charging power circuit 10 is excluded from the enclosure 13, making the intelligent lithium-battery-activating charging device 14 of the present invention a separate, stand-alone device that is connectable between an existing charged device 9 and a charging power circuit 10 that is originally provided for the existing charged device 9. By further connecting the charging power circuit 10 to an AC power source of an electric main, the intelligent lithium-battery-activating charging device 14 of the present invention can control the charging operation that the charging power circuit 10 applies to the internally accommodated lithium battery inside the existing charged device 9 (here an existing electrical appliance, such as a mobile phone and a notebook is taken as the existing charged device 9 with the internal lithium battery being not shown).

Figure 4:
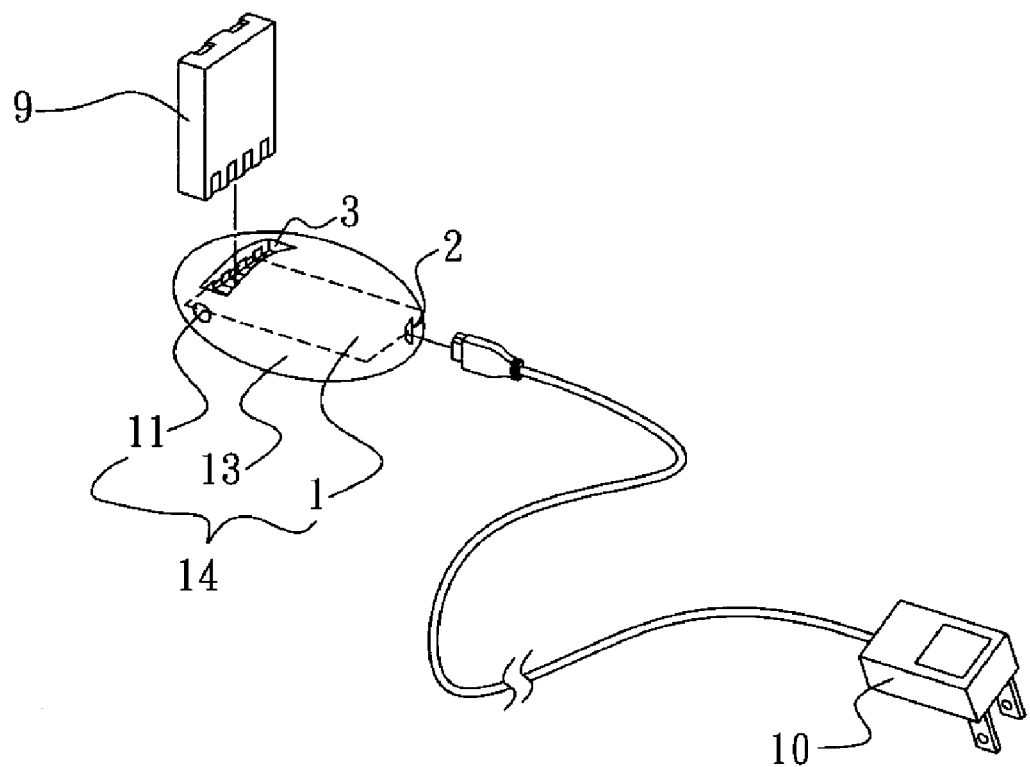
FIG. 4 is a schematic view demonstrating another example of practical operation of the intelligent lithium-battery-activating charging device of the present invention.

As shown in a schematic view demonstrating another example of practical operation illustrated in FIG. 4, similar to FIG. 3, the charging power input terminal 2 of the intelligent lithium-battery-activating charging device 14 of the present invention can be connected to an output terminal of an existing charging power circuit 10, where the existing charging power circuit 10 is an internal circuit of a plug-type AC to DC transformer belonging to an existing electrical appliance. The controllable charging power output terminal 3 allows direct plug-in of a lithium battery that is used by the existing electrical appliance (here the lithium battery directly serving as the existing charged device 9), whereby the whole structure seems like a base of a market-available charger and has an internal circuit architecture identical to what discussed in previously mentioned FIG. 4, but added with the function of the indication circuit 11 and the control circuit 7 being modified to additionally detect temperature (not shown in the control circuit 7 but being aware from the previous discussion), whereby the indication circuit 11 uses the light-emitting diode to indicate a fully-charged condition or a temperature abnormality condition.

Figure 5:
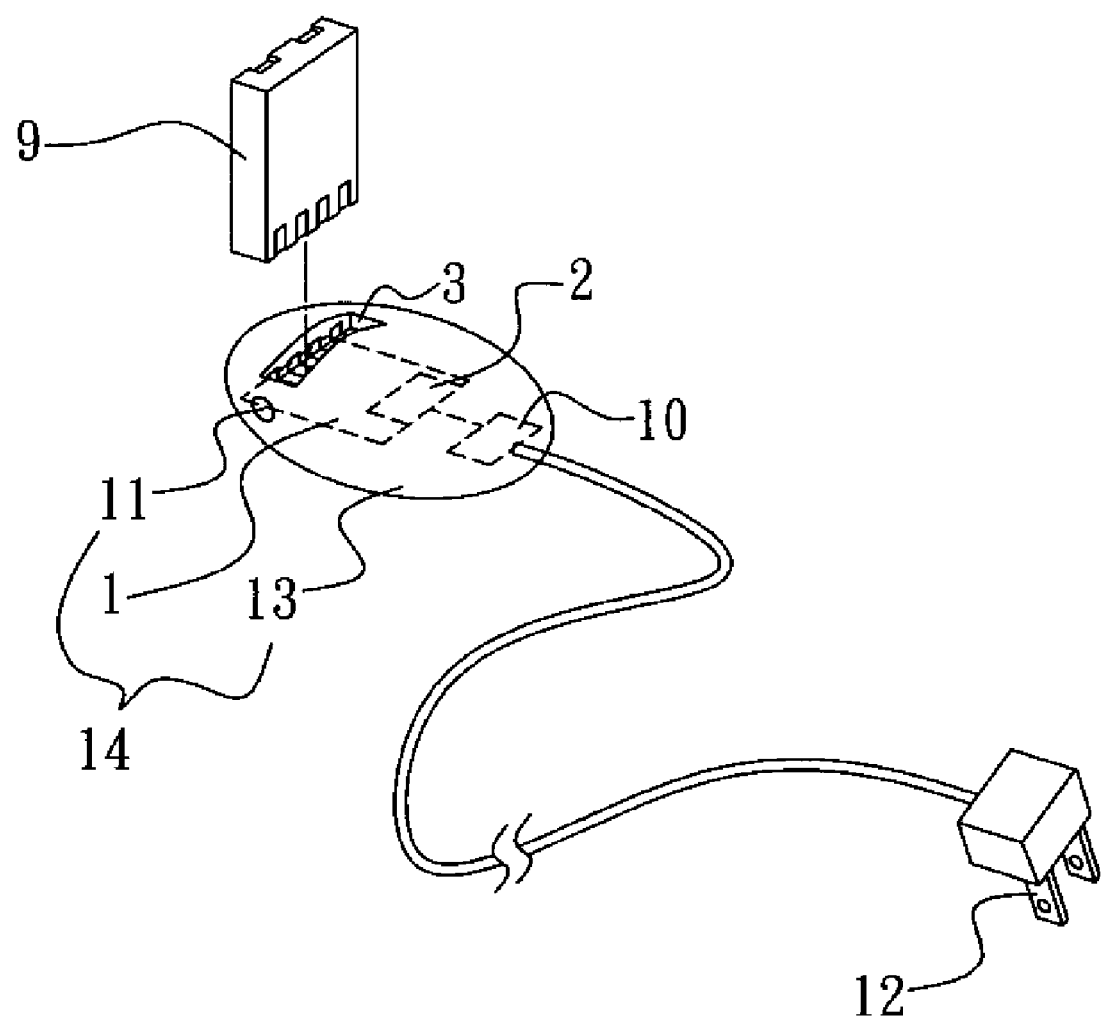
FIG. 5 is a schematic view demonstrating a further example of practical operation of the intelligent lithium-battery-activating charging device of the present invention.

As shown in a schematic view demonstrating a further example of practical operation illustrated in FIG. 5, similar to what shown in FIG. 4, the controllable charging power output terminal 3 of the intelligent lithium-battery-activating charging device 14 of the present invention allows direct plug-in of an existing charged device 9 but the charging power input terminal 2 that is connectable with a charging power circuit 10 is hidden inside the enclosure 13 of the device 14 to provide a fixed connection with the charging power circuit 10 (AC to DC power circuit) also housed in the device 14 with only an AC male plug terminal 12 exposed outside, so that the device 14, as a whole, provides a complete-function charger.

Figure 6:
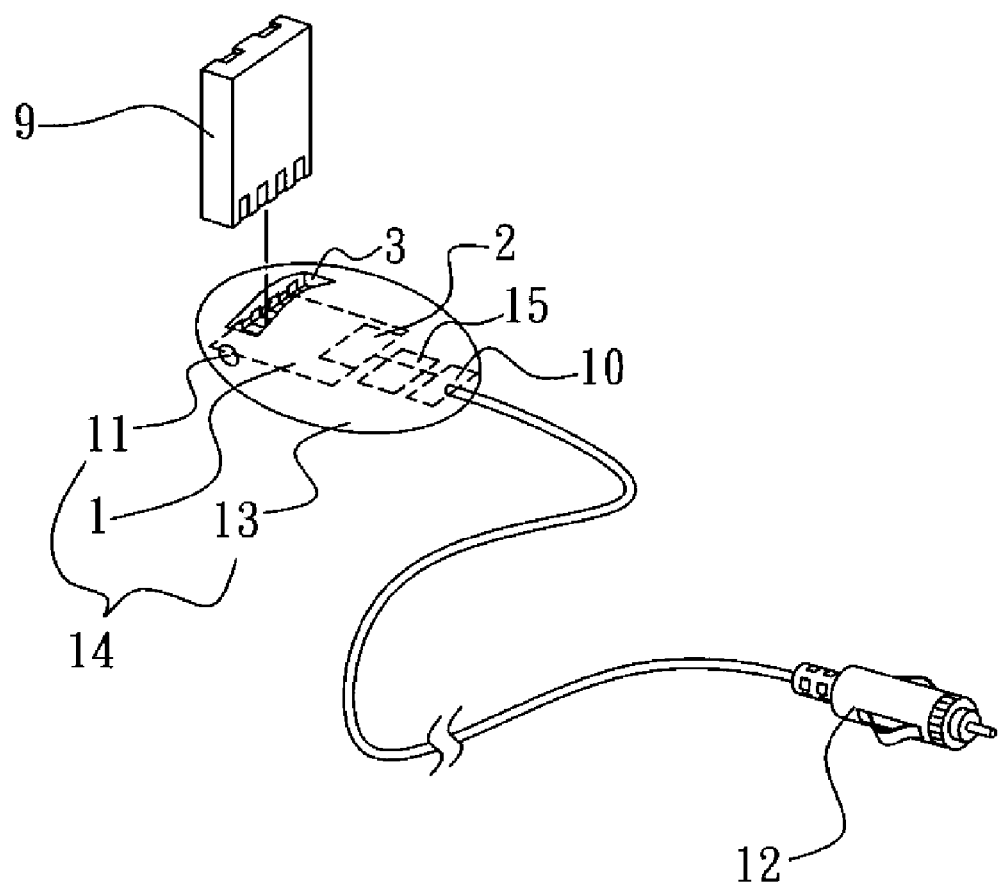
FIG. 6 is a schematic view demonstrating yet a further example of practical operation of the intelligent lithium-battery-activating charging device of the present invention.

As shown in a schematic view demonstrating yet a further example of practical operation illustrated in FIG. 6, similar to what shown in FIG. 4, the controllable charging power output terminal 3 of the intelligent lithium-battery-activating charging device 14 of the present invention allows direct plug-in of an existing charged device 9 but the charging power input terminal 2 that is connectable with a charging power circuit 10 is additionally provided with a DC to DC converter 15. The converter 15 can be a buck resistor or a DC boost circuit of a general DC circuit and is directly connected to the charging power input terminal 2 for adjusting voltage. Thus, no further circuit diagram is shown in the drawings. This is suitable for any DC output of the charging power circuit 10, and allows the device 14 to receive electrical power from various sources.

By adjusting short periods of time of charging and discharging that are applied to batteries of different levels of aging during charging processes, a digital mode of high performance of charging can be obtained and can be built in the form of software inside the microprocessor of the control circuit 7 shown in FIGS. 1 and 2 so that the intelligent lithium-battery-activating charging device 14 of the present invention can be opened and delay the voltage detection of the original charging system to realize a charging operation with high performance activation of a lithium battery.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An intelligent lithium-battery-activating charging device, comprising an enclosure containing an operation circuit, which is composed of a charging power input terminal, a controllable charging power output terminal, a charge gate control circuit, a discharge gate control circuit, a discharged electricity consuming circuit, and a control circuit, the control circuit comprising a microprocessor, the charging power input terminal being connectable to an output terminal of a charging power circuit, the controllable charging power output terminal being adapted to connect to a charging terminal of a charged device, the charge gate control circuit having an input terminal connected to the charging power input terminal to receive direct-current charging power supplied by the charging power circuit, the charge gate control circuit having an output terminal, which is split into three branches, of which a first one is connected in series through the controllable charging power output terminal to the charged device, a second one is connected to a first input terminal of the control circuit, and a third one is connected in series through the discharged electricity consuming circuit to the discharge gate control circuit for grounding, the control circuit having a first output terminal connected to a gate control terminal of the charge gate control circuit, the control circuit having a second output terminal connected to a gate control terminal of the discharge gate control circuit, the control circuit having a power input terminal connected to the charging power input terminal to receive the direct-current charging power supplied from the charging power circuit, whereby by means of the control circuit respectively issuing commands to the charge gate control circuit and the discharge gate control circuit during a charging process, the charge gate control circuit and the discharge gate control circuit are alternately and repeatedly opened and closed in a controlled manner to carry out a process of successive cycles of charging and discharging, delaying voltage detection of a charging system to allow a battery to be completely charged, and whereby during the process of charging, the charged device is subjected to repeated electro-chemical stimulation to be gradually activated in respect of power accumulation performance thereof.

2. The intelligent lithium-battery-activating charging device according to claim 1, wherein the charge gate control circuit comprises a field effect transistor, a first transistor, a first resistor, a second resistor, a third resistor, and a fourth resistor, the field effect transistor having a source connected to the charging power input terminal, a drain connected to the controllable charging power output terminal and also connected to the discharged electricity consuming circuit and serving as the gate control terminal of the charge gate control circuit, and a gate connected through the third resistor to a collector of the first transistor, a base of the first transistor being connected through the first resistor to the first output terminal of the control circuit, a node between the base of the first transistor and the first resistor being grounded through the second resistor, an emitter of the first transistor being grounded, the fourth resistor being connected between the gate and the source of the field effect transistor.

3. The intelligent lithium-battery-activating charging device according to claim 1, wherein the discharge gate control circuit comprises a fifth resistor, a sixth resistor, and a second transistor, the second transistor having a collector connected to the discharged electricity consuming circuit and a base serving as the gate control terminal of the discharge gate control circuit and connected in series through the fifth resistor to the second output terminal of the control circuit, a node between the base of the second transistor and the fifth resistor being grounded through the sixth resistor, an emitter of the second transistor being grounded.

4. The intelligent lithium-battery-activating charging device according to claim 1, wherein the discharged electricity consuming circuit comprises an electrical resistor.

5. The intelligent lithium-battery-activating charging device according to claim 1, wherein the charged device comprises an existing electrical appliance that is chargeable directly from outside an enclosure thereof to an internally accommodated lithium battery.

6. The intelligent lithium-battery-activating charging device according to claim 1, wherein the charged device comprises a lithium battery that is deposited in an existing electrical appliance.

7. The intelligent lithium-battery-activating charging device according to claim 5, wherein the charging power circuit comprises an internal circuit of a plug-type alternate-current to direct-current transformer mating an existing electrical appliance.

8. The intelligent lithium-battery-activating charging device according to claim 6, wherein the charging power circuit comprises an internal circuit of a plug-type alternate-current to direct-current transformer mating an existing electrical appliance.

9. The intelligent lithium-battery-activating charging device according to claim 1, wherein the charge gate control circuit comprises a bipolar transistor, a first transistor, a first resistor, a second resistor, a third resistor, and a fourth resistor, the bipolar having a collector connected to the charging power input terminal, an emitter connected to the controllable charging power output terminal and also connected to the discharged electricity consuming circuit, and a base serving as the gate control terminal of the charge gate control circuit and connected through the third resistor to the collector of the first transistor, a base of the first transistor being connected through the first resistor to the first output terminal of the control circuit, a node between the base of the first transistor and the first resistor being grounded through the second resistor, an emitter of the first transistor being grounded, the fourth resistor being connected between the base and the collector of the bipolar transistor.

10. An intelligent lithium-battery-activating charging device, comprising an enclosure containing an operation circuit, which is composed of a charging power input terminal, a controllable charging power output terminal, a charge gate control circuit, a discharge gate control circuit, a discharged electricity consuming circuit, an indication circuit, a control circuit, and a charging power circuit, the control circuit comprising a microprocessor, the charging power input terminal being connectable to an output terminal of the charging power circuit, the controllable charging power output terminal being adapted to connect to a charging terminal of a charged device, the charge gate control circuit having an input terminal connected to the charging power input terminal to receive direct-current charging power supplied by the charging power circuit, the charge gate control circuit having an output terminal, which is split into three branches, of which a first one is connected in series through the controllable charging power output terminal to the charged device, a second one is connected to a first input terminal of the control circuit, and a third one is connected in series through the discharged electricity consuming circuit to the discharge gate control circuit for grounding, the control circuit having a first output terminal connected to a gate control terminal of the charge gate control circuit, the control circuit having a second output terminal connected to a gate control terminal of the discharge gate control circuit, the control circuit having a power input terminal connected to the charging power input terminal to receive the direct-current charging power supplied from the charging power circuit, whereby by means of the control circuit respectively issuing commands to the charge gate control circuit and the discharge gate control circuit during a charging process, the charge gate control circuit and the discharge gate control circuit are alternately and repeatedly opened and closed in a controlled manner, and each time when the discharge gate control circuit completes discharge of electricity, a short period of time of stop is applied to allow the control circuit to detect voltage and temperature of the charged device, so as to carry out a process of successive cycles of charging and discharging, delaying voltage detection of a charging system to allow a battery to be completely charged, and whereby during the process of charging, the charged device is subjected to repeated electro-chemical stimulation to be gradually activated in respect of power accumulation performance thereof and repeatedly detects the voltage and temperature of the charged device so that when the charged device is fully charged or temperature abnormality occurs, the control circuit immediately transmits a signal to activate the indication circuit.

11. The intelligent lithium-battery-activating charging device according to claim 10, wherein the charge gate control circuit comprises a field effect transistor, a first transistor, a first resistor, a second resistor, a third resistor, and a fourth resistor, the field effect transistor having a source connected to the charging power input terminal, a drain connected to the controllable charging power output terminal and also connected to the discharged electricity consuming circuit and the first input terminal of the control circuit and serving as the gate control terminal of the charge gate control circuit, and a gate connected through the third resistor to a collector of the first transistor, a base of the first transistor being connected through the first resistor to the first output terminal of the control circuit, a node between the base of the first transistor and the first resistor being grounded through the second resistor, an emitter of the first transistor being grounded, the fourth resistor being connected between the gate and the source of the field effect transistor.

12. The intelligent lithium-battery-activating charging device according to claim 10, wherein the discharge gate control circuit comprises a fifth resistor, a sixth resistor, and a second transistor, the second transistor having a collector connected to the discharged electricity consuming circuit and a base serving as the gate control terminal of the discharge gate control circuit and connected in series through the fifth resistor to the second output terminal of the control circuit, a node between the base of the second transistor and the fifth resistor being grounded through the sixth resistor, an emitter of the second transistor being grounded.

13. The intelligent lithium-battery-activating charging device according to claim 10, wherein the discharged electricity consuming circuit comprises an electrical resistor.

14. The intelligent lithium-battery-activating charging device according to claim 10, wherein the indication circuit comprises a seventh resistor connected in series with a light-emitting diode, an end of the seventh resistor opposite to the end thereof connected to the light-emitting diode being connected to the third output terminal of the control circuit, an end of the light-emitting diode that is opposite to the end thereof connected to the seventh resistor being grounded.

15. The intelligent lithium-battery-activating charging device according to claim 10, wherein the charged device comprises a lithium battery that is independently deposited in an existing electrical appliance.

16. The intelligent lithium-battery-activating charging device according to claim 10, wherein the charging power input terminal is concealed inside the enclosure to provide a fixed connection with the charging power circuit that is also housed by the enclosure with only an alternate-current male plug terminal exposed outside, so that the intelligent lithium-battery-activating charging device, as a whole, serves as a stand-alone charger.

17. The intelligent lithium-battery-activating charging device according to claim 10, wherein the charge gate control circuit comprises a bipolar transistor, a first transistor, a first resistor, a second resistor, a third resistor, and a fourth resistor, the bipolar having a collector connected to the charging power input terminal, an emitter connected to the controllable charging power output terminal and also connected to the discharged electricity consuming circuit, and a base serving as the gate control terminal of the charge gate control circuit and connected through the third resistor to the collector of the first transistor, a base of the first transistor being connected through the first resistor to the first output terminal of the control circuit, a node between the base of the first transistor and the first resistor being grounded through the second resistor, an emitter of the first transistor being grounded, the fourth resistor being connected between the base and the collector of the bipolar transistor.

18. An intelligent lithium-battery-activating charging device, comprising an enclosure containing an operation circuit, which is composed of a charging power input terminal, a controllable charging power output terminal, a charge gate control circuit, a discharge gate control circuit, a discharged electricity consuming circuit, an indication circuit, a control circuit, a direct-current to direct-current converter, and a charging power circuit, the control circuit comprising a microprocessor, the charging power input terminal being connectable to an output terminal of the charging power circuit with the direct-current to direct-current converter being connected between the charging power input terminal and a charging power source of the device, the controllable charging power output terminal being adapted to connect to a charging terminal of a charged device, the charge gate control circuit having an input terminal connected to the charging power input terminal to receive direct-current charging power supplied by the charging power circuit, the charge gate control circuit having an output terminal, which is split into three branches, of which a first one is connected in series through the controllable charging power output terminal to the charged device, a second one is connected to a first input terminal of the control circuit, and a third one is connected in series through the discharged electricity consuming circuit to the discharge gate control circuit for grounding, the control circuit having a first output terminal connected to a gate control terminal of the charge gate control circuit, the control circuit having a second output terminal connected to a gate control terminal of the discharge gate control circuit, the control circuit having a power input terminal connected to the charging power input terminal to receive the direct-current charging power supplied from the charging power circuit, whereby by means of the control circuit respectively issuing commands to the charge gate control circuit and the discharge gate control circuit during a charging process, the charge gate control circuit and the discharge gate control circuit are alternately and repeatedly opened and closed in a controlled manner, and each time when the discharge gate control circuit completes discharge of electricity, a short period of time of stop is applied to allow the control circuit to detect voltage and temperature of the charged device, so as to carry out a process of successive cycles of charging and discharging, delaying voltage detection of a charging system to allow a battery to be completely charged, and whereby during the process of charging, the charged device is subjected to repeated electro-chemical stimulation to be gradually activated in respect of power accumulation performance thereof and repeatedly detects the voltage and temperature of the charged device so that when the charged device is fully charged or temperature abnormality occurs, the control circuit immediately transmits a signal to activate an indication circuit.

19. The intelligent lithium-battery-activating charging device according to claim 18, wherein the charge gate control circuit comprises a field effect transistor, a first transistor, a first resistor, a second resistor, a third resistor, and a fourth resistor, the field effect transistor having a source connected to the charging power input terminal, a drain connected to the controllable charging power output terminal and also connected to the discharged electricity consuming circuit and the first input terminal of the control circuit and serving as the gate control terminal of the charge gate control circuit, and a gate connected through the third resistor to a collector of the first transistor, a base of the first transistor being connected through the first resistor to the first output terminal of the control circuit, a node between the base of the first transistor and the first resistor being grounded through the second resistor, an emitter of the first transistor being grounded, the fourth resistor being connected between the gate and the source of the field effect transistor.

20. The intelligent lithium-battery-activating charging device according to claim 18, wherein the discharge gate control circuit comprises a fifth resistor, a sixth resistor, and a second transistor, the second transistor having a collector connected to the discharged electricity consuming circuit and a base serving as the gate control terminal of the discharge gate control circuit and connected in series through the fifth resistor to the second output terminal of the control circuit, a node between the base of the second transistor and the fifth resistor being grounded through the sixth resistor, an emitter of the second transistor being grounded.

21. The intelligent lithium-battery-activating charging device according to claim 18, wherein the discharged electricity consuming circuit comprises an electrical resistor.

22. The intelligent lithium-battery-activating charging device according to claim 18, wherein the indication circuit comprises a seventh resistor connected in series with a light-emitting diode, an end of the seventh resistor opposite to the end thereof connected to the light-emitting diode being connected to the third output terminal of the control circuit, an end of the light-emitting diode that is opposite to the end thereof connected to the seventh resistor being grounded.

23. The intelligent lithium-battery-activating charging device according to claim 18, wherein the charged device comprises a lithium battery that is independently deposited in an existing electrical appliance.

24. The intelligent lithium-battery-activating charging device according to claim 18, wherein the charge gate control circuit comprises a bipolar transistor, a first transistor, a first resistor, a second resistor, a third resistor, and a fourth resistor, the bipolar having a collector connected to the charging power input terminal, an emitter connected to the controllable charging power output terminal and also connected to the discharged electricity consuming circuit, and a base serving as the gate control terminal of the charge gate control circuit and connected through the third resistor to the collector of the first transistor, a base of the first transistor being connected through the first resistor to the first output terminal of the control circuit, a node between the base of the first transistor and the first resistor being grounded through the second resistor, an emitter of the first transistor being grounded, the fourth resistor being connected between the base and the collector of the bipolar transistor.

* * * * *